Dec. 14, 1943.  W. W. REDMON  2,336,804
LEVEL
Filed Oct. 7, 1942   2 Sheets-Sheet 1
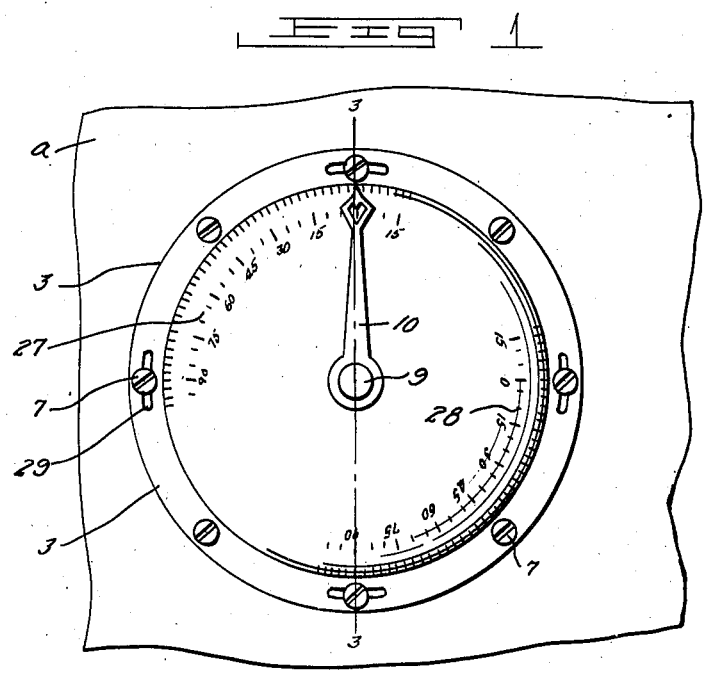
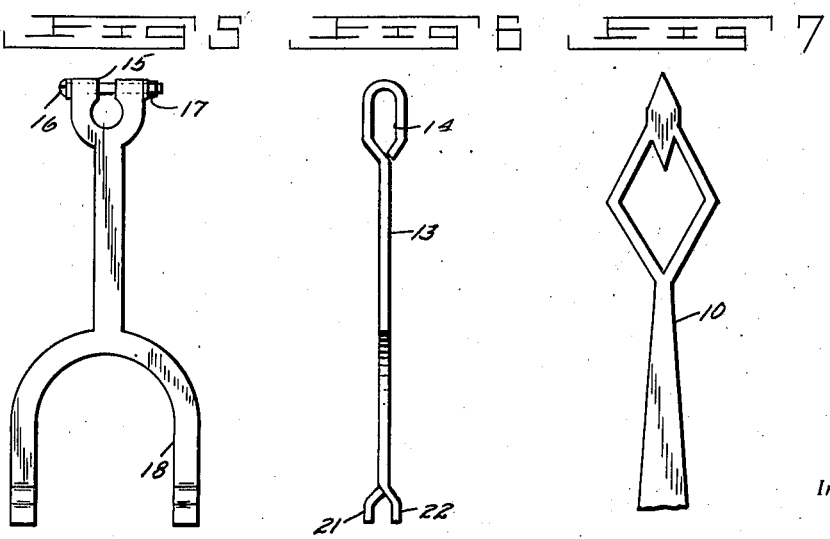
Inventor
Walter W. Redmon
By Clarence A. O'Brien
and Harvey B. Jacobson
Attorneys Dec. 14, 1943.  W. W. REDMON  2,336,804
LEVEL
Filed Oct. 7, 1942  2 Sheets-Sheet 2
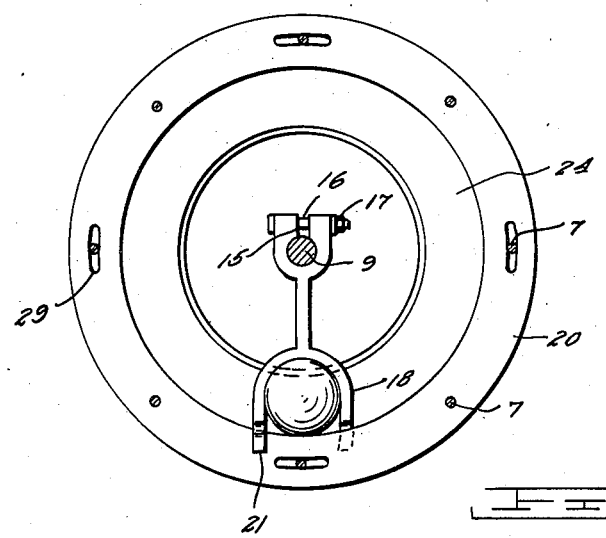
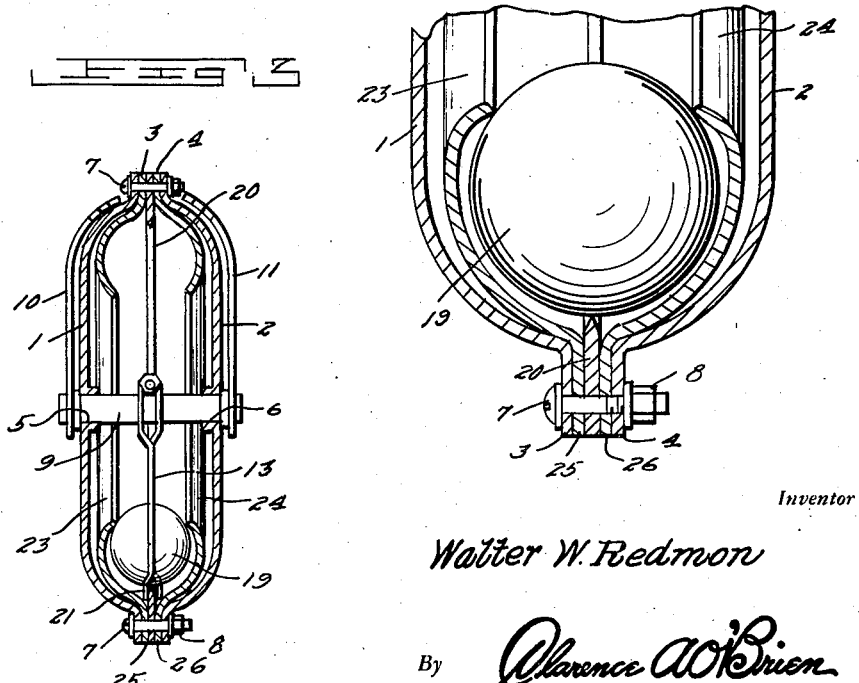
Inventor
Walter W. Redmon
By Clarence A. O'Brien
and Harvey B. Jacobson
Attorneys Patented Dec. 14, 1943

2,336,804

UNITED STATES PATENT OFFICE 2,336,804

LEVEL

Walter W. Redmon, Mobile, Ala., assignor to William T. Wilson, Mobile, Ala.

Application October 7, 1942, Serial No. 461,165

1 Claim. (Cl. 33—215)

My invention relates to levels, and more particularly to angle indicating devices therefor.

The principal object of the invention is to provide a simply constructed, efficient, mechanical angle indicating device which is accurate, involves few parts, and is inexpensive to manufacture.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a fragmentary view in side elevation illustrating my improved angle indicator in its preferred embodiment, Figure 2 is a view partly in side elevation and partly in section of the angle indicator with one of the casing sections removed, Figure 3 is a view in transverse section taken on the line 3—3 of Figure 1, Figure 4 is a similar fragmentary view drawn to an enlarged scale, Figure 5 is a view in side elevation of the pendulum arm, Figure 6 is a view in edge elevation of said arm, and Figure 7 is a fragmentary view in side elevation of one of the indicator hands.

Referring to the drawings by numerals, my improved indicator device is designed to be mounted, in any suitable manner, in a circular opening $b$ in the usual level stock $a$.

The indicator device comprises a circular casing including a pair of complemental, dished sections 1, 2 provided with circumferential edge flanges 3, 4 and axial journal bearings 5, 6, said sections being secured together in opposed relation, with open sides facing, by means of screw bolts 7 passing through said flanges, 3, 4 and equipped with nuts 8.

A shaft 9 is journaled at the ends thereof in the bearings 5, 6. A pair of indicator hands 10, 11 are suitably fixed upon opposite ends of the shaft 9 to extend from one and the same side of the shaft parallel alongside the outer sides of the sections 1, 2 with outer ends curving over the dished portions of said sections.

A pendulum arm 13 is fixed at an inner end thereof on the shaft 9, centrally thereof, to swing in the casing. The fixed end of the pendulum arm 13 is bent laterally upon itself into loop form, as at 14, and split longitudinally, as at 15, to form a wide split clamp for straddling said shaft 9. A screw bolt 16 extends through said loop on one side of the shaft 9 and is equipped with a nut 17 whereby said arm is secured to said shaft. The other end of the pendulum arm 13 has the form of a fork 18 coplanar with the casing and straddling a ball 19, preferably of steel, and riding on a knife edge, annular, track member 20 interposed between the flanges 3, 4, of the sections 1, 2 and through which the screw bolts 7 extend. The outer ends of the fork 18 are laterally offset oppositely, relatively, as at 21, 22 to straddle and ride against opposite sides of the knife edge of the track member 20 to thereby stabilize the pendulum arm 13 against lateral play.

The ball 19 is confined in a cage comprising a pair of transversely arcuate, annular sections 23, 24 opposed side by side upon opposite sides of the track member 20 to curve over the ball 19 with inner edges spaced apart and forming annular guides for said ball. The sections 23, 24 are provided with outer edge circumferential flanges 25, 26 interposed between the flanges 3, 4 and the track member 20 and through which the screw bolts 7 pass to clamp said flanges and said member 20 together. As shown in Figures 3 and 4, the sections 23, 24, with the exception of the inner edges thereof, clear the ball 19 so that the latter rides on the track member 20 and inner edges solely to reduce frictional resistance to operation of the ball.

Returning now to the described casing, each section 1, 2 is graduated on its outer face, around the base of the flanges 3, 4 to provide dials on each side of the device over which the hands 10, 11 swing and which are divided and numbered according to the degrees of a circle so that the indicator may be read from either side. As shown at 27, the graduations may be numbered in ascending order from the transverse center of the stock $a$ to the horizontal center of said stock, and, as shown at 28, in ascending order from the longitudinal center to the transverse center of said stock.

The flanges 3, 4 are provided with circumferential slots 29 through which the screw bolts 7 extend so that the sections 1, 2 may be relatively adjusted circumferentially to properly register the graduations 27, 28 in mounting the device in the stock $a$.

The manner in which the described indicator device operates will be readily understood. As the stock $a$ is placed against a wall, or other surface, the ball 19 runs under the influence of gravity on the track member 20 and in the cage members 23, 24 to swing the pendulum arm 13 and thereby rock the shaft 9 and swing the arms 10, 11 over the dial to indicate the angle of inclination from the vertical or horizontal, as the case may be, of the wall or surface.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a level including a stock, an angle indicating device comprising a circular casing mounted in said stock coplanar therewith and having circular series of graduations upon opposite sides thereof, a shaft rotatably mounted in the sides of said casing axially thereof, a pair of indicator hands fast on opposite ends of said shaft, respectively, for movement over said series of graduations under rotation of the shaft, and means to rotate said shaft under the influence of gravity comprising a ball mounted in said casing for rolling action in a path concentric to said shaft, and a pendulum arm fast at one end on said shaft and having a forked end straddling said ball, the mounting for said ball comprising a cage in said casing including a pair of opposed complemental annular sections transversely curved and a knife edge track, said sections and track confining said ball against movement radially and laterally of the casing and contacting the ball at points substantially 120 degrees apart.

WALTER W. REDMON.